(No Model.)
W. J. HOGGSON & E. P. BEMENT.
CHUCK.
No. 493,502. Patented Mar. 14, 1893.
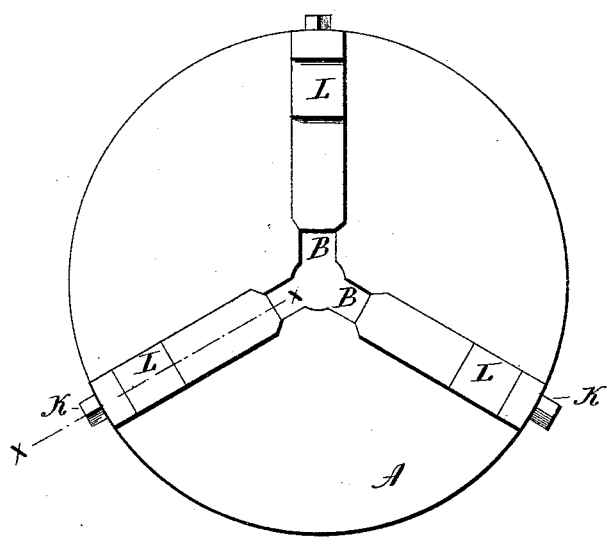
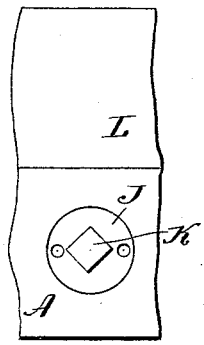
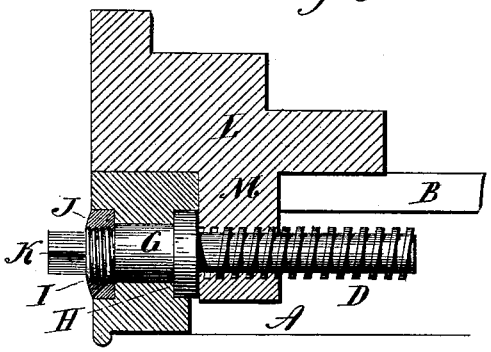
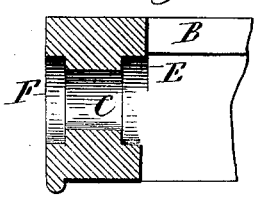
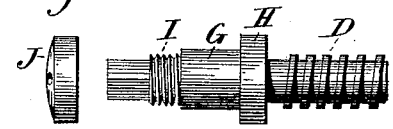
Witnesses
J. N. Shumway
Lillian D. Kelsey
William J. Hoggson
& Edward P. Bement
Inventors
By attys
Earle Seymour

UNITED STATES PATENT OFFICE.

WILLIAM J. HOGGSON AND EDWARD P. BEMENT, OF NEW HAVEN, CONNECTICUT, ASSIGNORS TO THE HOGGSON & PETTIS MANUFACTURING COMPANY, OF SAME PLACE.

CHUCK.

SPECIFICATION forming part of Letters Patent No. 493,502, dated March 14, 1893.

Application filed April 18, 1892. Serial No. 429,624. (No model.)

*To all whom it may concern:*

Be it known that we, WILLIAM J. HOGGSON and EDWARD P. BEMENT, of New Haven, in the county of New Haven and State of Connecticut, have invented a new Improvement in Chucks; and we do hereby declare the following, when taken in connection with accompanying drawings and the letters of reference marked thereon, to be a full, clear, and exact description of the same, and which said drawings constitute part of this specification, and represent, in—

Figure 1, a face view of the chuck complete. Fig. 2, a longitudinal section cutting on line $x$—$x$ of Fig. 1, enlarged. Fig. 3, a radial section cutting through the periphery of the head, the same as Fig. 2, the jaw and the screw removed. Fig. 4, a side view of a portion of the chuck showing the outer end of the screw-shank. Fig. 5, a side view of the screw detached, with the collar removed. Fig. 6, a side view of the collar.

This invention relates to an improvement in the construction of that class of chucks in which several jaws are arranged radially in a disk, and each jaw provided with a radial screw held in the head or disk against longitudinal movement, but free to revolve, and the screws connected with the jaws by nuts so that rotation of the screws will move the jaws outward or inward according to the direction in which the screws are turned.

The object of this invention is to construct the head solid, and yet permit the screws to be properly secured in place and readily removable, and the invention consists in the construction as hereinafter described and particularly recited in the claim.

A, represents the head of the chuck, which is in the usual form, and is constructed with radial grooves B B, according to the number of jaws required. The head around its periphery is constructed solid and integral, the grooves B, extend to a point near the periphery of the head, as seen in Fig. 3. The grooves are under-cut transversely, as usual. Through the periphery of the head and in line with the under-cut portions of the grooves, radial openings C, are formed as the bearing for the screws D, and at the inner ends the openings are counter-bored to form an annular shoulder E, and on the periphery the openings are counter-bored to form similar shoulders F, as seen in Fig. 3. The screws D, are each constructed with a shank G, corresponding to the openings C, between the two shoulders E F, and at the inner end of this shank, a collar H, is permanently attached to, or formed as a part of the screws, this collar corresponds to the counter-bores upon the inside which forms the shoulders E. At the outer ends of the shanks G, screw-threads I, are formed, and onto these screw-threads collars J are placed, as seen in Figs. 2 and 3, these collars corresponding to the counter-bores which form the shoulders F, and so that the collars J, are substantially inclosed in the periphery of the head of the chuck. The shanks of the screws extend outside the collars J, and terminate in angular shaped projections K, to which a wrench may be applied to turn the screws, as usual in this class of chucks.

The jaws L, are arranged in the grooves, in the usual manner, and are each constructed with an inwardly projecting nut M, through which the screws extend, as seen in Fig. 2, and as usual in this class of chucks, and so that by applying an instrument to the annular projection K, of the screws, and turning the same, the jaws will be moved accordingly. The screws are introduced by removing the collars J, and then setting the screws into the grooves inside the bearings C, and then passing the shanks through the bearings until the collars H, reach the home position, as seen in Fig. 2, and then the screw-collars J, are applied upon the outside, as seen in Fig. 2, thus securing the screws in place and holding them firmly against longitudinal movement, but yet so as to permit free revolution. This construction simplifies the chuck materially, and permits the readjustment of either screw or jaw without disturbing the others, as must necessarily be the case in divided heads.

The threading of the screws for the collars J, should be the reverse of the screw-threads which operate the jaws, the thread of the screws for the engagement of the jaws being left handed, that of the collars should be right-handed, and so that as the jaws are forced inward to grasp the article placed in the chuck, the strain will come upon the stationary collars H at the inner end of the bearing, and without tendency to loosen the collars J, then when turned in the opposite direction to withdraw the jaws or to engage them for internal connection so that the bearing comes upon the collars J, the tendency of such rotation will be to more firmly force the collars J, to their seats.

We do not claim broadly a chuck of the character described having a solid head, but What we do claim is—

In a chuck, the head of which is constructed with several radial grooves, with jaws arranged for radial movement in the said grooves, the combination therewith of screws arranged in said radial grooves, and respectively engaging the several jaws, the head of the chuck constructed solid at its periphery and with openings radially through said periphery into said grooves, the screws constructed with a shank corresponding to said openings, and each screw constructed with a stationary annular collar adapted to take a bearing around the inside of the openings in the head, the shanks screw-threaded at their outer end and provided with corresponding screw-threaded collars adapted to take a bearing around the outer end of said openings, substantially as described.

In testimony whereof we have signed this specification in the presence of two subscribing witnesses.

WILLIAM J. HOGGSON.
EDWARD P. BEMENT.

Witnesses:
 H. B. KENNEDY,
 FRED C. EARLE.